United States Patent [19]
Fleischer

[11] 4,143,893
[45] Mar. 13, 1979

[54] CLAMPING DEVICE

[76] Inventor: Henry Fleischer, 18 Notch Park Rd., Little Falls, N.J. 07424

[21] Appl. No.: 819,822

[22] Filed: Jul. 28, 1977

Related U.S. Application Data

[60] Division of Ser. No. 658,582, Feb. 17, 1976, Pat. No. 4,062,573, which is a division of Ser. No. 479,667, Jun. 17, 1974, abandoned, which is a continuation-in-part of Ser. No. 427,149, Dec. 21, 1973, abandoned.

[51] Int. Cl.$^2$ ............................................. F16L 33/22
[52] U.S. Cl. ................................. 285/243; 285/308; 285/320
[58] Field of Search ............... 285/243, 242, 320, 319, 285/322, 309, 308

[56] References Cited
U.S. PATENT DOCUMENTS

| | | | |
|---|---|---|---|
| 940,678 | 11/1909 | Doane et al. | 285/370 X |
| 1,390,564 | 9/1921 | Knorr | 285/243 |
| 2,280,892 | 4/1942 | Cowles | 285/243 |
| 2,360,572 | 10/1944 | Mejean | 285/320 |
| 2,726,848 | 12/1955 | Montgomery et al. | 285/320 |
| 3,724,882 | 4/1973 | Dehar | 285/243 |

FOREIGN PATENT DOCUMENTS 363984  11/1922  Fed. Rep. of Germany .......... 285/243

Primary Examiner—Thomas F. Callaghan

[57] ABSTRACT

There is provided a clamping member for attaching one part of a two part coupling device to a conduit, such as a hose, said clamping member comprising a body section having a bore running therethrough and comprising a first end portion, an intermediate portion and a second end portion, said first end portion being adapted to be connected to one part of the two part hose coupling device. The clamping member further includes at least a pair of spaced apart clamping rods each of which is pivotally connected to the body section of the clamping member, each of said clamping rods including a clamp section connected at one end of said rod, and an annular ring disposed about said body section in contact with said clamping rods, so that when a hose is inserted in the second end portion of the body section, the annular ring member can be positioned so as to bear against the connecting rods and force the connecting rods to be pivoted downwardly so that the clamp section thereof will be forced against the hose and thereby hold the hose in said body section.

10 Claims, 4 Drawing Figures

CLAMPING DEVICE

REFERENCE TO OTHER APPLICATIONS

This application is a Divisional application of application Ser. No. 658,582 filed Feb. 17, 1976, now U.S. Pat. No. 4,062,573 which is a Divisional application of application Ser. No. 479,667, filed June 17, 1974, now abandoned which is a Continuation-In-Part of application Ser. No. 427,149 filed Dec. 21, 1973, now abandoned.

FIELD OF THE INVENTION

The present invention relates to a clamping member which can be employed to connect one part of a two part coupling device to a hose, such connection and/or subsequent disconnection being effected manually without the need for employing tools.

BRIEF STATEMENT OF THE INVENTION

The present invention provides a clamping member for attaching one part of a two part hose coupling device such as described in application Ser. No. 479,667 filed June 17, 1974 now abandoned and the continuation-in-part application Ser. No. 658,581 filed Feb. 17, 1976 now U.S. Pat. No. 4,101,149, such as the socket member or the plug member, to a hose. The clamping member comprises a body section having a bore running therethrough and includes a first end portion, an intermediate portion and a second end portion, the first end portion being adapted to be connected to one part of the two part coupling device, said one part of the coupling device including a tubular end portion having a bore running therethrough, such as a conventional nipple. The clamping member will also include at least a pair of spaced apart clamping rods, each of which is pivotally connected to the body section of the clamping member, each of said clamping rods including a clamp section connected at one end thereof. An annular ring member is disposed about the body portion of the clamping member in contact with the clamping rods, so that when a hose is inserted in the second end portion of the body section, the annular ring member can be positioned so as to force the connecting rods to be pivoted downwardly so that the clamp sections thereof will be forced against the hose and thereby hold the hose in place in the body portion and in communication with the one part of the coupling device. The unique clamping members as described above will allow attachment of the components of the coupling device to conduit sections, such as to two hoses, by hand, without the need for employing wrenches or other tools. Furthermore, the unique clamping members may include a protective cover or sleeve which protects these devices from the impact received upon dropping the same on hard surfaces.

DETAILED DESCRIPTION OF PREFERRED EMBODIMENTS

Figure 1:
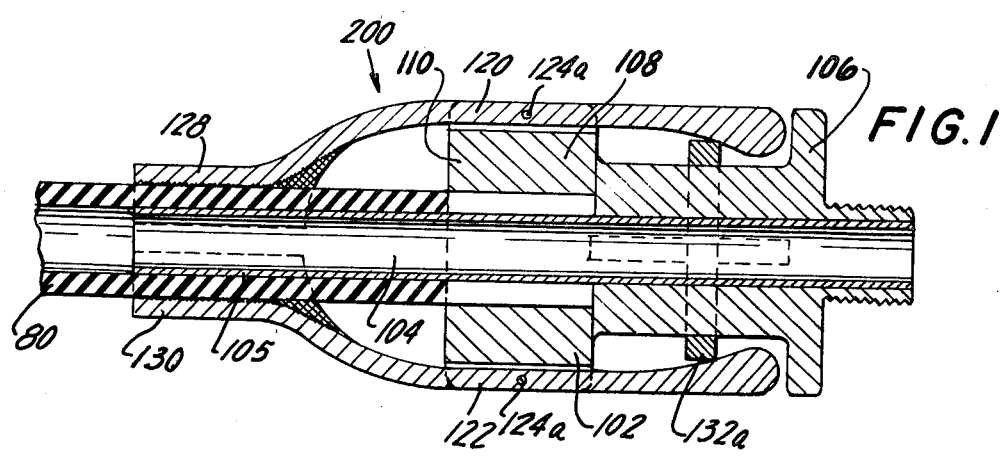
FIG. 1 is a sectional view of a clamping member in accordance with the present invention.

Referring now to the accompanying FIGS. wherein like parts are represented by like numerals in the several views, in FIG. 1, a clamping member in accordance with the present invention is shown and is identified generally by the numeral 200. The clamping member 200 is employed for attaching one part of a two part coupling device, such as for example, a plug member or a socket member, to a hose section 80. The clamping member 200 comprises a body section 102 having a bore 104 running therethrough defined by inner walls of the body section 102. The body section 102 comprises a first end portion 106, an intermediate portion 108 and a second end portion 110. The first end portion 106 is adapted to be connected to the one part of the two part coupling device, such as the second end portion of the plug member. Disposed within the bore 104 is inner sleeve 105 which aids in securing a hose to the clamping member as will be described hereinafter.

The second end portion of the plug member will include a nipple or tubular extension which is adapted to be seated in and extend into the bore 104 and inner sleeve 105 of the body section 102. It will be appreciated that the nipple of the plug member will have a bore which communicates with the bore 104 of the body section when the nipple of the plug member is seated in the body section 102.

The clamping member will include at least a pair of spaced apart clamping rods 120, 122 each of said rods being pivotally connected at one end portion (123) thereof to the body section of the clamping member by means of pivot pins 124 as shown. The other end of the clamping rods 120, 122 will include clamp sections 128, 130, respectively, which are adapted to be pressed against the surface of the hose section 80. The clamp sections 128, 130 will preferably include gripping surfaces, such as ribbed inner surfaces to aid in gripping of the hose section.

The clamping rods 120 and 122 will preferably be positioned on the body portion 102 of the clamping member 200 so that the clamp sections 128, 130 are disposed oppositely with respect to each other and are in contact with opposite surfaces of the hose section 80, when the clamp sections are in their closed position. It is preferred that the clamp sections 128, 130 are formed with a slight curvature or arc so that they can be positioned about substantially any diametered hose in a manner such that the clamp sections will not ordinarily contact each other when in their closed position.

The clamping rods 120, 122, in this embodiment, are pivotally connected to the body portion 102 of the clamping member 200 so that the connecting rods 120 and 122 pivot via pivot pins 124a at an intermediate point thereof about the body section 102. Ring member 132a is disposed about the body section 102 and beneath the connecting rods 120, 122, preferably at a point or location near the back end or end of the connecting rods away from the clamp sections 128, 130 as shown in FIG. 1. The rear portion of the clamping rods 120, 122 in this embodiment will be inclined, as shown. Thus, when it is desired to close the clamp sections 128, 130 about a hose section 80, the ring member 132a will be moved backwardly, for example, towards the plug member to cause the connecting rods, 120, 122 to pivot toward the hose section 80 and to cause the clamp sections 128, 130 to be pressed against the hose section 80. When it is desired to open the clamp sections 128, 130, so as to release the hose section 80, the ring member 132a will be moved toward the clamp sections 128, 130 thereby causing the clamping rods 120, 122 to be moved away from the hose section 80 and thereby carrying the clamp sections 128, 130 away from said hose section.

Figure 2:
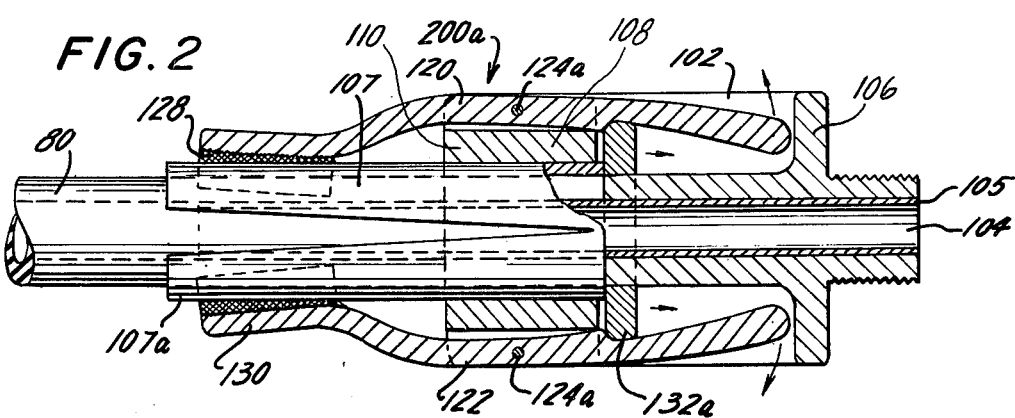
FIG. 2 shows an alternative embodiment of the clamping member of FIG. 1.
Figure 4:
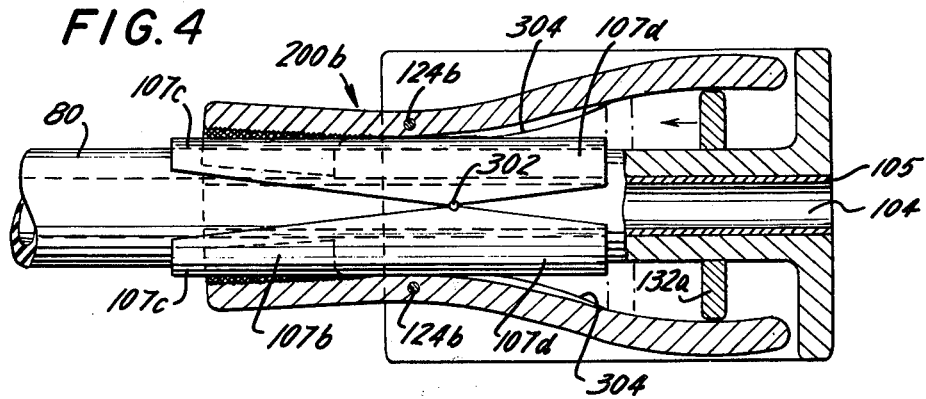
FIG. 4 is yet a further alternative embodiment of the clamping member of the invention.
Figure 3:
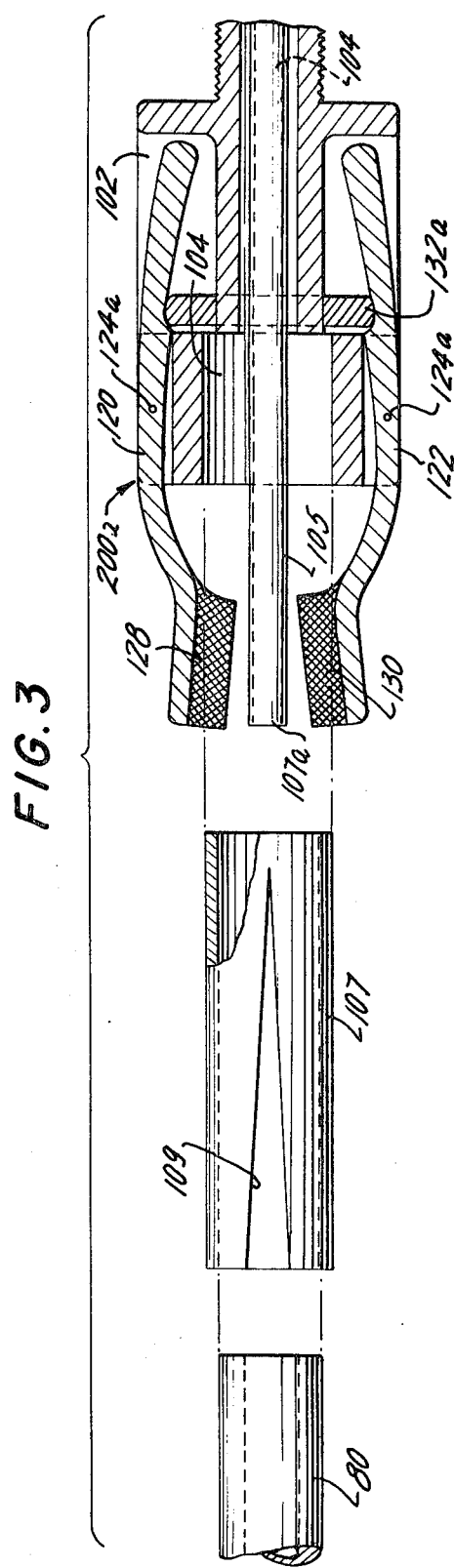
FIG. 3 is an exploded view of the embodiment of the clamping member shown in FIG. 2.

The clamping member of the invention may also include, in addition to the stem or inner sleeve 105, an outer sleeve 107 such as formed of plastic material or rubber or other hard or resilient material, as shown in FIGS. 2 and 4, for the reasons set out hereinafter. The clamping member 200a shown in FIGS. 2 and 3 is similar to the clamping member 200 shown in FIG. 1 with the main exception that it includes the outer sleeve 107 which is disposed within the clamping member concentrically to but spaced from the inner sleeve 105, as shown. The outer sleeve 107 will be connected to the body section 102 by any conventional means and will, at least in part, be disposed within of the body section 102. As shown, one end 107a of the outer sleeve 107 will extend to the clamp sections 128, 130.

The clamping member including the outer sleeve 107 functions as follows: one end of the hose section 80 is placed in the clamping member 200a over the inner-sleeve 105 but under the outer sleeve 107 and the ring 132a is moved away from the hose section 80 thereby causing the clamp sections 138, 130 to be forced down upon the outer sleeve 107, thereby forcing sleeve 107 against the hose 80 and the hose 80 against the inner sleeve 105. The hose 80 is thereby tightly held in place in the clamping member 200a over the inner sleeve 105 but under the outer sleeve 107.

As shown in FIGS. 2 and 3, the outer sleeve 107 may include a slit or wedge-shaped cutout 109 so as to enable crushing of the sleeve 107 by the clamp sections 128, 130 about the hose.

In the clamping member 200b shown in FIG. 4, the sides of the outer sleeve 107b are split and joined together at pivot point 302. Furthermore, the clamping rods 120, 122 are pivoted at pivot point 124b and the rods are inclined such that when the ring 132a is moved toward the clamp sections 128, 130, the clamp sections are forced against the outer sleeve 107b. The front ends 107c of the sleeve 107b are thereby pivoted downwardly and crushed against the hose seated between the sleeves 105 and 107b. Furthermore, the back ends 107d of the sleeve 107b are pivoted upwardly against the surfaces 304 of the body section 102 and are thereby held in place against such body sections.

What is claimed is:

1. A clamping member for manually attaching one part of a two part hose coupling device to a hose without the need for employing tools, comprising, in combination, a body section having a bore running therethrough, and comprising a first end portion, an intermediate portion and a second end portion, said first end portion being adapted to be connected to one part of a two part hose coupling device; at least a pair of spaced apart clamping rods each pivotally connected to said body section of said clamping member, each of said clamping rods including a clamp section connected at one end of said rod; and rod moving means disposed about said body section of said clamping member between said body section and said clamping rods, further including an outer sleeve member disposed in said body section of said clamping member in a manner such that when a hose section is fitted within said clamping member, a portion of said hose is disposed under or within said outer sleeve, said outer sleeve being adapted to be crushed against said hose by said clamping rods so that when a hose is inserted in said second end portion of said body section said rod moving means can be manually moved away from said clamp sections of said clamping rods so as to force said clamp sections downwardly towards said body section and against said outer sleeve and said hose and thereby hold said hose in place in said body section and in communication with said one part of said coupling device.

2. The clamping member in accordance with claim 1 wherein said clamping rods are positioned opposite each other on said body section so that said clamp sections are in contact with opposite surfaces of said hose.

3. The clamping member in accordance with claim 1 wherein said clamp sections are spaced from each other when disposed in contact with said hose.

4. The clamping member in accordance with claim 1 wherein said rod moving means member comprises a ring member disposed about said body section of said clamping member.

5. The clamping member in accordance with claim 1 further including an inner sleeve member disposed within said bore of said body section of said clamping member, in a manner such that when a hose section is fitted within said clamping member, a portion of said hose is disposed over at least a portion of said inner sleeve member.

6. The clamping member in accordance with claim 1 wherein said outer sleeve includes a cutout portion so as to enable crushing of the outer sleeve by said clamp sections about said hose.

7. The clamping member in accordance with claim 1 wherein said outer sleeve includes a wedge-shaped cutout.

8. The clamping member in accordance with claim 1 wherein the sides of said outer sleeve are split and said sides are pivotally connected to each other so that portions of said outer sleeve may be pivoted downwardly and crushed against said hose.

9. The clamping member in accordance with claim 1 wherein said clamping rods comprise a first end portion, an intermediate portion and a second end portion and said clamp sections are connected to said second end portions thereof.

10. The clamping member in accordance with claim 9 wherein said intermediate portions of said clamping rods are pivotally connected to said body section of said clamping member.

* * * * *